(12) United States Patent
Gregoire

(10) Patent No.: US 6,758,239 B2
(45) Date of Patent: Jul. 6, 2004

(54) METAL DIAPHRAGM STRUCTURE FOR PRESSURE REGULATORS

(76) Inventor: Roger J. Gregoire, 460 Elm Valley Dr., Bulverde, TX (US) 78163

( * ) Notice: Subject to any disclaimer, the term of this patent is extended or adjusted under 35 U.S.C. 154(b) by 0 days.

(21) Appl. No.: 10/065,693

(22) Filed: Nov. 11, 2002

(65) Prior Publication Data

US 2003/0089402 A1 May 15, 2003

Related U.S. Application Data

(60) Provisional application No. 60/345,098, filed on Nov. 9, 2001.

(51) Int. Cl.[7] ............................................. G05D 16/06
(52) U.S. Cl. .................................. 137/505.42; 137/505
(58) Field of Search ...................... 137/505.37, 505.42, 137/505.45, 505; 92/103 M

(56) References Cited

U.S. PATENT DOCUMENTS

| | | | | | |
|---|---|---|---|---|---|
| 2,704,548 | A | * | 3/1955 | Ralston | ................... 92/103 M |
| 3,683,955 | A | * | 8/1972 | Beynon | ...................... 137/495 |
| 4,635,683 | A | * | 1/1987 | Nielsen | ................. 137/625.65 |
| 4,719,940 | A | * | 1/1988 | Beavers | ................. 137/505.39 |
| 4,744,387 | A | * | 5/1988 | Otteman | ................. 137/505.41 |

* cited by examiner

Primary Examiner—Stephen M. Hepperle
(74) Attorney, Agent, or Firm—Novak Druce LLP

(57) ABSTRACT

A metal diaphragm structure for pressure regulators for increasing flow capacity, flow control, and pressure rating. The structure includes a specially shaped metal diaphragm installed and clamped on its periphery into the outlet cavity of a pressure regulator body. The diaphragm is a circular thin metal disc dome shaped with specifically controlled height and thickness values.

18 Claims, 4 Drawing Sheets

*PRIOR ART* *PRIOR ART*

METAL DIAPHRAGM STRUCTURE FOR PRESSURE REGULATORS

CROSS REFERENCE TO RELATED APPLICATIONS

The present application claims priority to U.S. Provisional Application No. 60/345,098, filed Nov. 9, 2001.

BACKGROUND OF INVENTION

1. Technical Field

The present invention relates generally to metal diaphragm regulators. More specifically, the present invention relates to a metal diaphragm structure for pressure regulators for increasing flow capacity, flow control, and pressure rating.

2. Background Information

Metal diaphragm regulators have been in use for years. Typically, metal diaphragm regulators include a flexible metal diaphragm clamped between a body section, and an actuator section.

The body section typically has at least one inlet, or high pressure fluid port and at least one outlet, or low pressure or regulated fluid port. A poppet valve, seat, and bias spring are typically contained within the body section. The poppet valve and seat separate the high pressure from the low regulated pressure. The bias spring biases the poppet valve against the seat enabling a positive fluid shut-off.

The actuator section, which usually contains an adjustably loaded compression spring commonly referred to as a 'range' spring, applies a downward reference force upon the upper surface of the diaphragm. This causes the diaphragm to deflect, engaging the poppet valve away from its valve seat and allowing fluid flow and pressure to build on the low-pressure side. The greater the deflection, the greater the poppet valve opening and corresponding fluid flow. The fluid pressure on the low-pressure side acts on the underside of the diaphragm applying an upward force. Obviously, the greater the pressure, the greater the upward force.

As such, the diaphragm's deflection/poppet opening is dictated by a balance-of-forces. The range spring applies a downward force. The balancing upward forces are the outlet pressure acting on the diaphragm effective surface area, the bias spring, the diaphragm or spring force, and the inlet pressure acting on the poppet/seat area. This can be illustrated by the equation Range Spring Force=Outlet Pressure Force+Bias Spring Force+ Diaphragm Spring Force+Inlet Pressure Force A problem with conventional metal diaphragm regulators is that the diaphragms have a positive spring rate that contributes to a reduction in flow capacity. Flow capacity is the usable flow range of a pressure regulator without significant loss in outlet pressure. The higher the diaphragm spring rate, the greater the reduction in flow capacity.

The diaphragm deflection multiplied by the diaphragm spring rate equals the diaphragm spring force. As the diaphragm and poppet valve deflect downward, not only does flow increase, but also the diaphragm spring force increases, with the amount of change dependent upon its spring rate. As shown in the above 'balance-of-forces' equation, an increase in diaphragm spring force contributes to a decrease in outlet pressure, resulting in a reduction of flow capacity.

This problem is further exasperated with a small or miniature metal diaphragm pressure regulator. Often it is desirable to use miniature metal diaphragm pressure regulators; however, what is not desirable is the extra reduction in flow capacity associated with the smaller size. Smaller diametrically sized diaphragms are less flexible, and they therefore typically have higher spring rates.

Examples of methods to reduce spring rates within a pressure regulator found in the art include U.S. Pat. Nos. 1,103,020 and 3,689,055. Although these help to reduce spring rates, they do so by requiring additional components, added complexity, and increased costs.

Another problem with conventional metal diaphragm regulators is that the diaphragm deflection and its associated poppet valve deflection is very small, particularly with smaller regulators, which limits the metering capability or controllability of the flow. The poppet valve as it deflects into or away from the valve seat changes the annular orifice area, thereby changing the flow. A greater deflection would allow for a finer and more controllable flow from the no-flow to full flow range. This would result in a smoother and more stable pressure control as flow demands change. To obtain the same flow range with a shorter deflection would result in a very 'coarse' flow control, resulting in a less stable pressure control.

Another problem with conventional metal diaphragm regulators is their low maximum inlet pressure rating. The maximum inlet pressure rating is primarily based on the weakest link, normally the thin metal diaphragm. Even though the diaphragm is located on the low-pressure side, the diaphragm must be able to hold without rupturing full inlet pressure with a suitable safety margin in the event of seat leakage. This is especially true in industries such as the semiconductor industry, where many of the gases that are pressure regulated are extremely hazardous (toxic, flammable, poisonous, pyrophoric, corrosive, etc.).

Metal diaphragms currently are designed to be as thin as reasonably possible so as to minimize the above-mentioned problems of high spring rate and short deflection. A thinner diaphragm has a lower spring rate and is typically able to deflect more. However, thinning out a diaphragm reduces its pressure holding capability.

While the inventions of the above-mentioned patents may be suitable for the particular purpose to which they address, they are not as suitable for increasing flow capacity, flow control, and pressure rating. Accordingly, there is a need for a metal diaphragm structure for pressure regulators that increases flow capacity, flow control, and pressure rating.

SUMMARY OF INVENTION

In view of the foregoing disadvantages inherent in known types of metal diaphragm regulators found in the art, the present invention provides a new metal diaphragm structure for pressure regulators construction that can be utilized for increasing flow capacity, flow control, and pressure rating. This metal diaphragm structure for pressure regulators substantially departs from the conventional concepts and designs of the prior art, and in so doing provides an apparatus primarily developed for the purpose of increasing flow capacity, flow control, and pressure rating.

The present invention generally includes a specially shaped metal diaphragm installed and clamped on its periphery into the outlet cavity of a pressure regulator body. The diaphragm is a circular thin metal disc dome shaped with specifically controlled height and thickness values.

The present invention further provides a metal diaphragm structure for pressure regulators that increases flow capacity, flow control, and pressure rating. The present invention also provides a metal diaphragm structure for pressure regulators that produces a non-positive spring rate throughout its usable deflection.

The metal diaphragm structure for pressure regulators of the present invention allows for a large deflection relative to its diametric size. The metal diaphragm structure of the present invention also utilizes a thick diaphragm material relative to its diametric size. Further, the metal diaphragm structure for pressure regulators according to the present invention increases flow capacity, flow control, and pressure rating without requiring additional components.

There has thus been outlined, rather broadly, the more important features of the invention in order that the detailed description thereof may be better understood, and in order that the present contribution to the art may be better appreciated. Additional features of the invention will be described hereinafter.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

Figure 1:
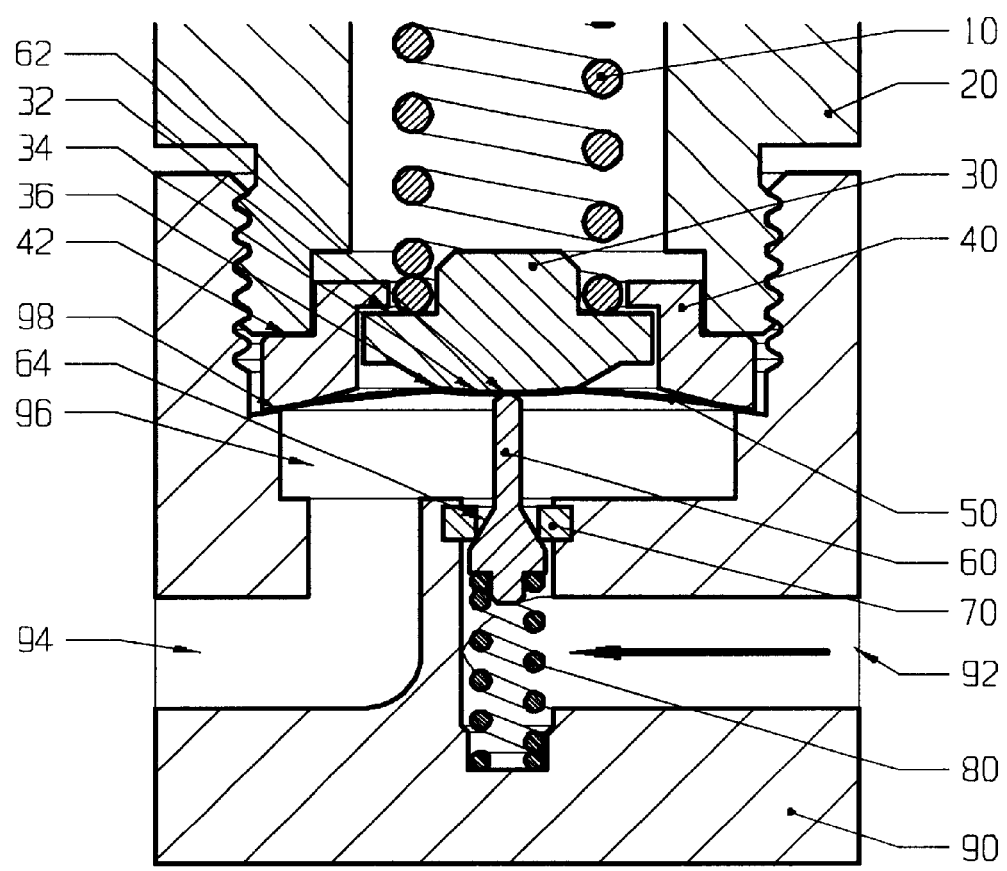
FIG. 1 is a cross sectional partial view of a pressure regulator incorporating the present invention.

Turning now descriptively to the drawings, in which similar reference characters denote similar elements throughout the several views, the attached figures illustrate a metal diaphragm structure for pressure regulators. The metal diaphragm structure includes a specially shaped metal diaphragm installed and clamped on its periphery into the outlet cavity of a pressure regulator body.

Figure 4:
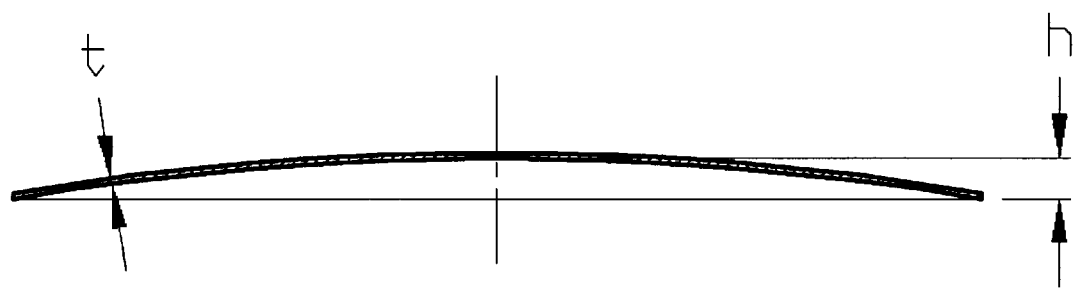
FIG. 4 is a cross sectional view of the present invention.

The diaphragm is a circular thin metal disc dome shaped with specifically controlled height and thickness values. Referring to FIG. 4, the diaphragm 50 is illustrated as being dome-shaped, having a height, h, and a thickness, t. Element 52 refers to the exterior or upper surface of the diaphragm 50. Element 54 refers to the interior or lower surface of the diaphragm 50. The values of h and t are specifically determined and held relative to each other so that the diaphragm has a controlled negative spring rate. It has been found through experimentation that, for a set of given conditions, e.g., diaphragm diametric size, clamping diameter, diaphragm plate contact area diameter, etc., varying the height to thickness (h/t) ratio controls the shape of the spring rate curve.

Figure 2A:
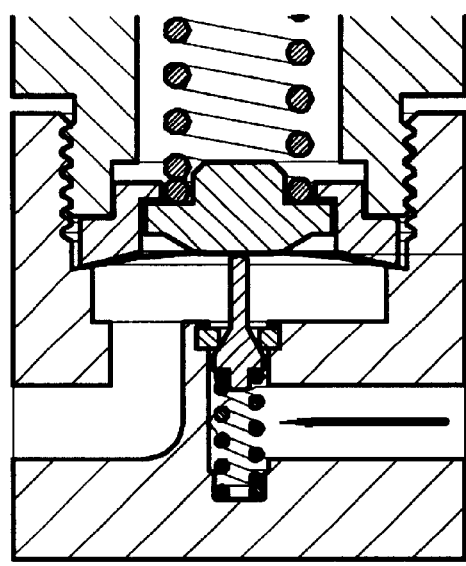
FIG. 2A is a cross sectional view showing the present invention slightly deflected in the no flow condition.
Figure 2B:
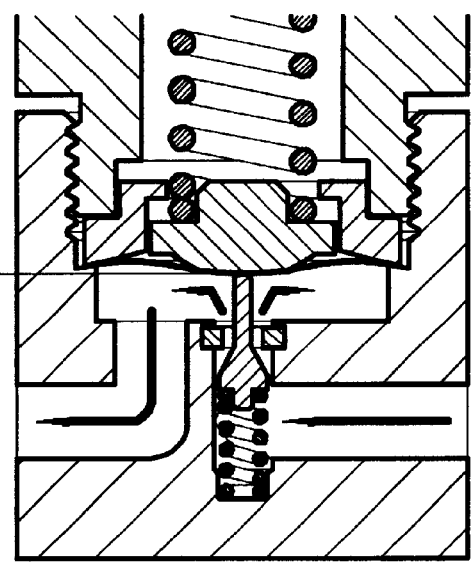
FIG. 2B is a cross sectional view showing the present invention fully deflected in the full flow condition.
Figure 2C:
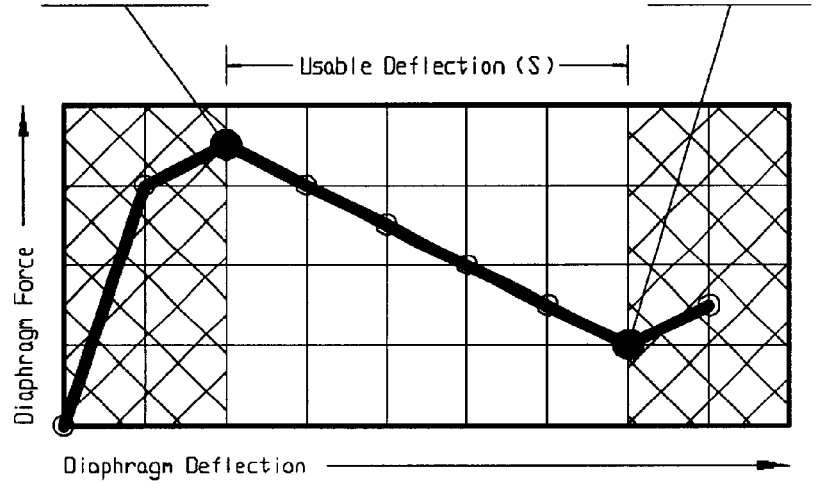
FIG. 2C is a graph representing the spring rate (force/deflection) of the present invention.

At a particular h/t ratio, a sinusoidal spring rate curve can be generated, as illustrated in FIG. 2C. The downward slope of this curve represents a negative spring rate. As an example, this particular curve was generated under a set of given conditions by an h/t ratio of approximately 7.8. The deflection range of the negative spring rate shown in FIG. 2C is set as the usable diaphragm deflection range S. FIG. 2A shows the start position of the diaphragm deflection, with the poppet valve 60 in the closed position. In this position, the diaphragm 50 is slightly deflected so that its poppet opening deflection starts in a non-positive spring rate slope. FIG. 2B shows the end position of the diaphragm deflection, with the poppet valve 60 in the full open position. The diaphragm 50 is deflected so that its deflection is finished before the spring rate goes positive.

Too high or too low an h/t ratio is undesirable. For example, using the same set of given conditions, an h/t value larger than 8.2 will create an undesirable bi-stable, snap through, oil-canning action, meaning that the diaphragm will snap through and hold in the inverted position until forced back. An h/t value of less than 7.4 will not generate any significant amount of negative spring rate; virtually all of the spring rate will be in the positive direction.

It is believed that these particular h/t values are specific only for this particular set of given conditions. Varying one or more of the conditions will shift the desired h/t value, which could be found through a trial-and-error approach.

Figure 3A:
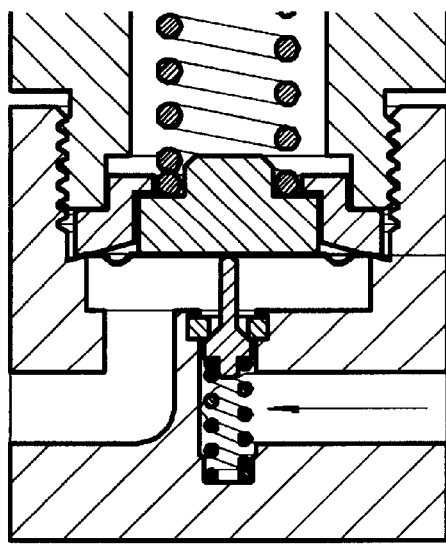
FIG. 3A is a cross sectional view showing a typical prior art diaphragm structure in the no flow condition.
Figure 3B:
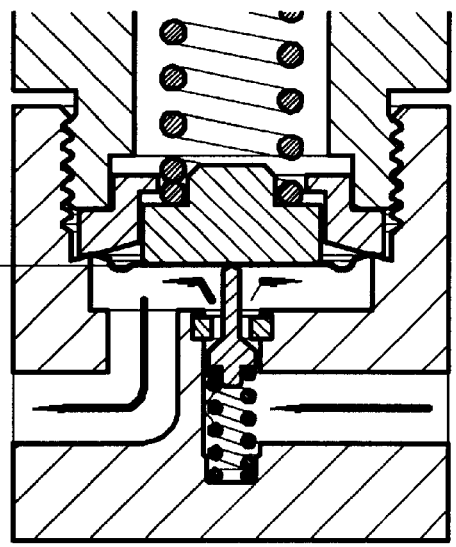
FIG. 3B is a cross sectional view showing a typical prior art diaphragm structure in the full flow condition.
Figure 3C:
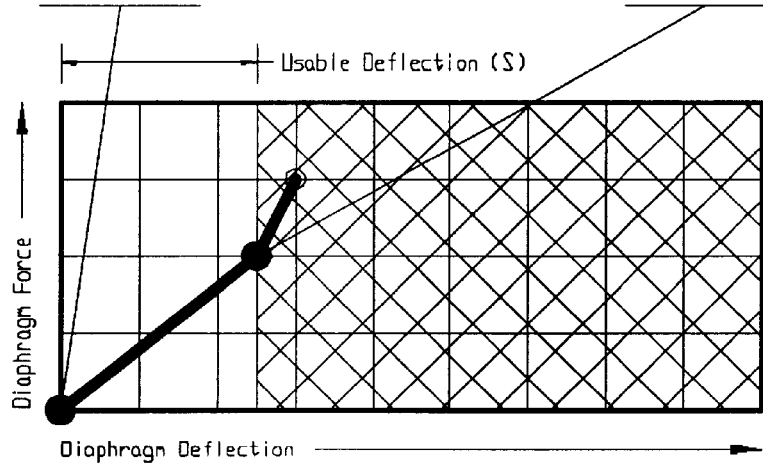
FIG. 3C is a graph representing the spring rate (force/deflection) of a typical prior art diaphragm structure.

Ideally, when designing a negative spring rate diaphragm, it is desirable to start with a thickness sufficient to meet a desired pressure rating. Then, vary the amount of dome and its height, thereby varying the h/t value, until the desired negative spring rate is generated. This dome shape design allows for a much greater deflection than prior-art pressure regulator diaphragms of equal diameters. The dome shape could be replaced with flat sections so as to approximate the dome radius. FIGS. 3A, 3B, and 3C represent a typical prior art diaphragm structure and its associated deflection and spring rate curve.

As shown in FIG. 1, an actuator section 20 threads into a regulator body section 90, loading a clamp plate 40 against the diaphragm 50 in sealing engagement with an edge 98 of the regulator body 90. A diaphragm plate 30 is held trapped between the diaphragm 50 and an interior shoulder 42 of the clamp plate 40. A range spring 10 applies a downward force upon the diaphragm plate 30, pressing the plate 30 against the diaphragm 50. The diaphragm 50 is held in contact with a diaphragm plate surface 34 and confined by a diametric edge 36, maintaining a constant surface area contact throughout the usable diaphragm deflection range. A bias spring 80 urges the poppet valve 60 into sealing engagement against a seat 70. The diaphragm 50, when deflected downward by the range spring 10 and diaphragm plate 30, engages a poppet valve tip 62, urging a poppet valve tapered surface 64 away from the seat 70. When the poppet valve 60 is in its full up position, the poppet valve surface 64 sealingly engages the seat 70, holding the diaphragm 50 slightly deflected at the beginning of its usable deflection range. The diaphragm 50 is placed into position within the regulator. If desirable, the diaphragm 50 could be welded or attached by other means at its periphery. Also, the diaphragm 50 and/or the poppet valve 60 could be physically attached to the diaphragm plate 30.

The range spring 10 is manually compressed and adjusted to set the desired outlet pressure at an outlet port 94. The range spring force is exerted upon the diaphragm plate 30, diaphragm 50, and poppet valve 60. Referring to FIGS. 2A and 2B, as the diaphragm 50 moves downward in response to force changes caused by increased flow demand, the poppet valve 60 moves downwardly away from the seat 70, allowing fluid to flow from the inlet port 92, around the poppet valve 60, through the seat 70, into an outlet cavity 96, and out through the outlet port 94.

The outlet pressure within the outlet cavity 96 places an upward force against the diaphragm 50 creating an upward force. The inlet pressure acting on the bottom side of poppet valve 30, i.e., the area roughly equivalent to the seat area, imposes an additional upward force on the diaphragm 50. The bias spring 80 also produces an upward force. The outlet pressure will vary accordingly so as to maintain a balance-of-forces. The balance of forces is as follows > Range spring force=Outlet Pressure (acting on diaphragm effective area) Force+Bias Spring Force+Inlet Pressure (acting on poppet seat area) Force+Diaphragm Spring Force As the diaphragm 50 and poppet valve 30 deflect in response to increased flow demand, the bias spring force, diaphragm spring force, and range spring force change with the deflection according to their individual spring rates. The net spring rate, determined by the summation of the individual spring rates multiplied by the deflection, equals the total force change that the outlet pressure must change so as to compensate for and maintain the 'balance-of-forces'. The range 10 and bias 80 springs both have positive spring rate values. The presently invented diaphragm has a 'negative' spring rate value, and when summed together with the range and bias spring rates give a lower net spring rate value than was the case with prior-art positive spring rate diaphragm. This lower net spring rate value yields a lower force change per given deflection, yielding a lesser decrease in outlet pressure as flow increases, thereby improving flow capacity.

It should be understood that the foregoing is considered as illustrative only of the principles of the invention. Further, since numerous modifications and changes will readily occur to those skilled in the art, the invention is not to be limited to the exact construction and operation shown and described. Accordingly, all suitable modifications and equivalents may be resorted to that fall within the scope of the invention.

What is claimed is:

1. A pressure regulator comprising:
   an actuator section for engaging a diaphragm with a regulator body section, the actuator section connectable with the regulator body section;
   a diaphragm plate positioned between the actuator section and the regulator body section, the diaphragm plate having a constant surface area of contact with a diaphragm; and
   a poppet valve for controlling flow through the pressure regulator, and the diaphragm having a controlled negative diaphragm spring rate throughout a useable deflection thereof.

2. The pressure regulator according to claim 1 wherein the negative spring rate is controlled by varying the height to thickness ratio of the diaphragm.

3. The pressure regulator according to claim 1, wherein the diaphragm is slightly deflected when the regulator is in the closed position, thereby causing the opening of the poppet valve to begin in a negative spring rate slope.

4. The pressure regulator according to claim 1, wherein during the opening of the poppet valve, the diaphragm is deflected before the spring rate becomes positive.

5. The pressure regulator according to claim 1, further comprising a clamp plate positioned between the actuator and diaphragm, the clamp plate and diaphragm securing the diaphragm plate within the pressure regulator.

6. The pressure regulator according to claim 1 wherein the diaphragm is dome-shaped.

7. The pressure regulator according to claim 1, further comprising:
   a range spring having a positive range spring rate, the range spring able to apply a downward force on the diaphragm plate against the diaphragm; and
   a bias spring having a positive bias spring rate, the bias spring able to apply an upward force against the poppet valve in sealing engagement with a seat, thereby closing flow through the pressure regulator.

8. The pressure regulator according to claim 7 wherein the summation of the range spring rate, bias spring rate and diaphragm spring rate yields a lower net spring rate value due to the diaphragm's negative spring rate.

9. The pressure regulator according to claim 8 wherein the lower net spring rate value lowers a force change per given deflection, thereby resulting in a lesser decrease in outlet pressure as flow increases and improved flow capacity through the regulator.

10. A pressure regulator comprising:
    an actuator section engaged with a regulator body section and having a metallic diaphragm positioned therebetween;
    a diaphragm plate located between the actuator section and the regulator body section and configured for relative reciprocating movement and abutting engagement with said metallic diaphragm; and
    said metallic diaphragm having a controlled negative diaphragm spring rate across a useable deflection thereof in said pressure regulator, said negative diaphragm spring rate being determined by a height to thickness ratio of the metallic diaphragm.

11. The pressure regulator according to claim 10 wherein the diaphragm plate has a constant surface area in contact with the metallic diaphragm.

12. The pressure regulator according to claim 11 further comprising a poppet valve for controlling flow through the pressure regulator.

13. The pressure regulator according to claim 12 wherein the metallic diaphragm is slightly deflected when the regulator is in a closed position thereby causing the opening of the poppet valve to begin in a negative spring rate slope.

14. The pressure regulator according to claim 12 further comprising a clamp plate positioned between the actuator and metallic diaphragm, the clamp plate and metallic diaphragm securing the diaphragm plate within the pressure regulator.

15. The pressure regulator according to claim 12 wherein the metallic diaphragm is dome-shaped.

16. The pressure regulator according to claim 12 further comprising:
    a range spring having a positive range spring rate and applying a downward force on the diaphragm plate against the diaphragm; and a bias spring having a positive bias spring and applying an upward force against the poppet valve in sealing engagement with a scat and thereby closing flow through the pressure regulator.

17. The pressure regulator according to claim 16 wherein the summation of the range spring rate, the bias spring rate and the metallic diaphragm spring rate yields a lower net spring rate value over a summation of the range spring rate and the bias spring rate due to the metallic diaphragm's negative spring rate.

18. The pressure regulator according to claim 17 wherein the lower net spring rate value lowers a force change per given deflection, thereby resulting in a lesser decrease in outlet pressure as flow increases and improved flow capacity through the regulator.

* * * * *